United States Patent Office 3,068,229
Patented Dec. 11, 1962

3,068,229
4-(17β-ANDROSTANYL)DERIVATIVES OF γ-VALEROLACTONES AND γ-BUTYROLACTONES, INTERMEDIATES THEREFOR, AND THEIR PROCESS OF PREPARATION
Bruno Camerino, Milan, and Umberto Valcavi, Varese, Italy, assignors to Societa Farmaceutici Italia, a corporation of Italy
No Drawing. Filed Apr. 14, 1961, Ser. No. 102,945
Claims priority, application Italy Apr. 20, 1960
10 Claims. (Cl. 260—239.57)

The present invention relates to a new class of therapeutically useful steroid compounds and to the process for their preparation. More particularly the present invention refers to the new 4(17β-androstanyl) derivatives of γ-valerolactone (and the homologous γ-butyrolactones) having the following general formula:

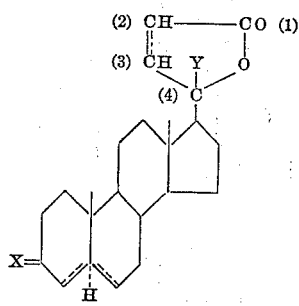

wherein a double bond in 4,5- or 5,6-position of the steroid may be present, in which case the hydrogen atom is absent in the 5-position, or lacking, in which case the steroid has the 5α configuration; a double bond in the 2,3-position of the lactonic ring may be either present or lacking; in the latter case, the group in 2,3-position is

—$CH_2$—$CH_2$—;

X is O, (H)OH, or (H)OR;
R is acylic radical of an organic acid containing from 1 to 9 atoms of carbon, e.g. formyl, propionyl, acetyl, valerianyl, succinyl, cyclopentanpropionyl, phenylpropionyl etc.;
Y is $CH_3$ or H.

Equivalent to the lactones of the above formula are the hydroxy-acids in equilibrium with said lactones and the salts which result from alkalization of said lactones and/or hydroxy-acids:

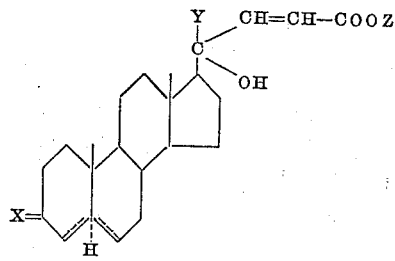

wherein Z is an alkaline or earth alkaline metal or ammonium radical and X and Y have the same previously given meanings.

The products of the present invention show a high antialdosteronic activity. As far as we know, the analogous products of literature, namely the 21-nor-methyl-23-aciloxy-17(20),22-coladien-24(20)-lactones (U.S. Patent 2,740,782 and U.S. Patent 2,740,783), the spirolactones of the 17-carboxy-(alkyl and alkenyl)-17-hydroxy steroids (U.S. Patent 2,875,199—Germ. P. 1,058,508) differ substantially from the new lactones described in the present invention.

The products of the present invention are obtained as shown in the following scheme (col. 3). The starting products are respectively pregnenolone (Ia) and the inferior homologous 17β-formyl-5-androstene-3β-ol-3-acetate (Ib), which is described in literature (Helv. Chim. Acta 23, 1940, p. 1367).

The starting products (I) are transformed into the corresponding ethynyl derivatives (II) by ethynyl magnesium bromide in tetrahydrofuran so that respectively the 20-ethynyl-5-pregnene-3β,20-diol (IIa) is obtained from Ia and the 20-ethynyl-21-nor-5-pregnene-3β,20-diol (IIb) from Ib. The 20-ethynyl-5-pregnene-3β,20-diol-3-acetate is well known in literature (J. Org. Chem. 24, 1959, p. 1278) and has been prepared from pregnenolone acetate with sodium acetylide in liquid ammonia. The ethynyl derivatives (II) are reacted with a Grignard reagent and then carboxylated with carbon dioxide in ether solution or in tetrahydrofuran to give the corresponding acids (III), so that respectively from IIa the 4-hydroxy-4-(3β-hydroxy-5-androsten-17β-yl)-2-pentinoic acid (IIIa) is obtained and from IIb the 4-hydroxy-4-(3β-hydroxy-5-androsten-17β-yl)-2-butinoic acid (IIIb) is obtained. From these acids (III), the corresponding 24(20)-lactones IV or V or VI are obtained by selective hydrogenation in the presence of suitable catalysts. In fact, the lactone of the 4-hydroxy-4-(3β-hydroxy-5-androsten-17β-yl)-2-pentenoic acid (IVa) and the butenoic homologue (IVb) are prepared respectively from IIIa and from IIIb by absorption of one mole of hydrogen and by carrying out the hydrogenation in the presence of Lindlar palladium in a tetrahydrofuranic or alcoholic solution. The lactone of the 4-hydroxy-4-(3β-hydroxy-5-androsten-17β-yl)-pentanoic acid (Va) and the butanoic homologue (Vb) are obtained respectively from IIIa and from IIIb by absorption of two moles of hydrogen and by carrying out the hydrogenation in the presence of 10% palladium over carbon in a tetrahydrofuranic or alcoholic solution. The lactone of the 4-hydroxy-4-(3β-hydroxy-5α-androstan-17β-yl)-pentanoic acid (VIα) and the butanoic homologue (VIb) are obtained respectively from IIIa and IIIb by absorption of three moles of hydrogen and by carrying out the hydrogenation in the presence of 10% palladium over carbon in a tetrahydrofuranic or alcoholic solution. From lactones IV, V, VI the corresponding 3-steroid esters VII, IX and XI are obtained by acylation with a chloride or an anhydride of an organic acid containing from 1 to 9 carbon atoms inclusive, in the presence or absence of tertiary amines, such as pyridine or dimethylaniline. The preferred acids are acetates, propionates, valerianates, phenylpropionates, cyclopentylpropionates and succinates. The corresponding 3-keto-analogues VIII, X and XII are also respectively obtained from lactones IV, V and VI by Oppenauer oxidation with aluminum isopropoxide in the presence of cyclohexanone and toluene of by oxidation with chromic and sulfuric acid in acetone. When a double bond is present in 5,6-position of the steroid, the bond migrates to 4,5-position. The lactone of 4-hydroxy-4-(3-keto-4-androsten-17β-yl)-2-pentenoic acid (VIIIa) and the butenoic homologue are respectively prepared from IVa and from IVb; the lactone of 4-hydroxy-4-(3-keto-4-androsten-17β-yl)-pentanoic acid (Xa) and the butanoic homologue are respectively obtained from Va and from Vb; the lactone of the 4-hydroxy-4-(3-keto-5α-androstan-17β-yl)-pentanoic acid (XIIa) and the butanoic homologue are respectively prepared from Va and Vb.

The new compounds of the present invention are well defined, crystalline, water-insoluble stable products, that are soluble both in usual organic solvents and in diluted inorganic bases.

It has been found that the present products, the lactone of the 4-hydroxy-4-(3β-hydroxy-5-androsten-17β-yl)-pen-

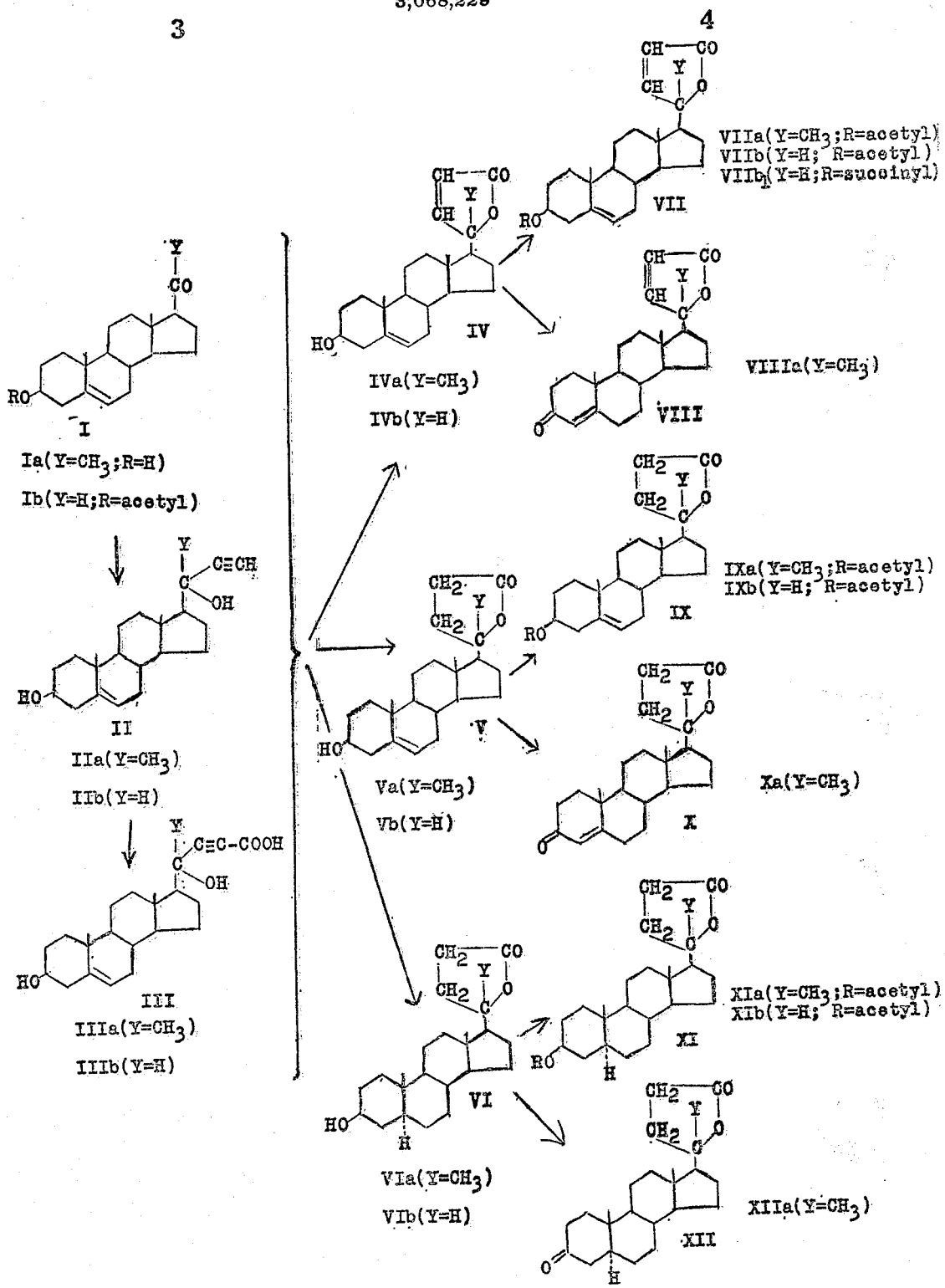

tanoic acid (Va) and the lactone of the 4-hydroxy-4-(3-keto-4-androsten-17β-yl)-2-pentenoic acid (VIIIa) particularly, show a high antialdosteronic activity, which is such to recommend their use therapeutically as natriuretics in all the cases of hyperaldosteronism.

Particularly, it has proved to be very useful in the treatment of the oedema associated with hepatic cirrhosis with ascites, with congestive cardiac decompensation with idiopathic oedema, with nephrotic syndrome; it may be applied also in the severe oedemata which are resistant to customary diuretics, and furthermore as auxiliary means in the diagnosis of primary hyperaldosteronism.

The pharmaceutical compositions, according to the present invention, comprise one or more compounds of the present invention which may be in equilibrium with the corresponding hydroxy-acids and/or the salts derived from alkalinization of the lactones or hydroxy-acids and may contain a significant quantity of both solid and/or liquid pharmaceutical carrier, in order to prepare the medicament in the form of tablets, pills, powder, capsules, suspensions, solutions, elixirs or whatever other form usually employed for subcutaneous or oral administration. Excipients, when present, may be: starch, lactose, sucrose, talc, magnesium stearate, pectine or further usually employed excipients. Percentage of ingredients may vary according to the adopted pharmaceutical form: the content of lactone of 4-hydroxy-4-(3β-acetoxy-5-androsten-17β-yl)-butanoic acid, generally of 1% at least, is preferably comprised between 5 and 40%. Preferred pharmaceutical compositions contain 100 mg. of lactone of 4-hydroxy-4-(3β-acetoxy-5-androsten-17β-yl)-butanoic acid.

Posology for adults has been established to be 100–500 mg. per day. When more rapid effects are desired, treatment is preferably started subcutaneously, while continuing the systematic treatment orally.

The following examples illustrate the invention, without limiting it in any way.

EXAMPLE 1

*20-Ethynyl-5-Pregnene-3β,20-Diol (IIa) From Ia*

Grignard reagent is prepared from 50 g. Mg, 157 cm.$^3$ of ethylbromide and 1400 cm.$^3$ of anhydrous tetrahydrofuran. This reagent, in a 3-hour period, is added dropwise into 820 cm.$^3$ of anhydrous tetrahydrofuran (previously saturated for 30 minutes with acetylene, washed through $H_2SO_4$, NaOH, $NaHSO_3$, $CaCl_2$) with constant stirring and a continuous stream of washed acetylene. At the end of the 3 hours, acetylene is passed through for 2 additional hours, then 10 g. of pregnenolone (Ia) are added and the mixture is refluxed for 20 hours. The resulting mixture is poured into 1 l. of ice-water, and acidified with 10% HCl, the tetrahydrofuran is evaporated at 40° C. under vacuum. Two liters of water are added and the product is filtered and washed with water. The crude product is dissolved in methanol, decolorized with carbon, filtered, concentrated, diluted with water and filtered. 9.6 g. of ethynyl derivative (IIa), melting at 210–225° C. are obtained.

EXAMPLE 2

*20-Ethynyl-21-Nor-5-Pregnene-3β,20-Diol (IIb) From Ib*

Grignard reagent is prepared from 40 g. Mg, 126 cm.$^3$ of ethyl bromide and 1160 cm.$^3$ of anhydrous tetrahydrofuran. This reagent, in a 3 hour period, is added dropwise into 660 cm.$^3$ of anhydrous tetrahydrofuran (previously saturated for 30 minutes with acetylene, washed through $H_2SO_4$, NaOH, $NaHSO_3$ and $CaCl_2$) with constant stirring and a continuous stream of washed acetylene. When addition is over, acetylene passes through for 2 additional hours, then 7 g. of Ib are added and the mixture is refluxed for 3 hours, then kept at room temperature overnight. The solution is then poured into 1 l. of ice-water, acidified with 10% HCl; the tetrahydrofuran is evaporated under vacuum at 40° C. 2 l. of water are added, the product is removed by filtration and washed with water. The crude product is crystallized from methanol and 4.1 g. of IIb, melting at 187–195° C., are obtained. A specimen crystallized from methanol melts at 206–208° C.

EXAMPLE 3

*4-Hydroxy-4-(3β-Hydroxy-5-Androsten-17β-Yl)-2-Pentinoic Acid (IIIa) From IIa*

Grignard reagent is prepared from 12 g. Mg, 38 cm.$^3$ of ethyl bromide and 500 cm.$^3$ of anhydrous tetrahydrofuran. 9.6 g. of ethynyl derivative IIa, melting at 210–225° C. (see Example 1), dissolved in 250 cm.$^3$ of anhydrous tetrahydrofuran, are added. The mixture is refluxed for 1.5 hour, then cooled at 0° C., and $CO_2$ dried through $H_2SO_4$ and $CaCl_2$, is bubbled through the mixture for 3 hours. The mixture is kept stirred overnight. The product is then decomposed between 0 and 10° C. by adding 500 cm.$^3$ of $NH_4Cl$ saturated water, acidified with conc. HCl to Congo red. The acidic waters, containing an abundant white precipitate, are filtered and, after drying, 6.5 g. of acid (IIIa), melting at 220–225° C. (with decomp.), are obtained. A specimen crystallized from methanol melts at 219– 220° C. $(\alpha)_D^{22} = +8$ (c.=1% in dioxane).

EXAMPLE 4

*4-Hydroxy-4-(3β-Hydroxy-5-Androsten-17β-Yl)-2-Butionic Acid (IIIb) From IIb*

Grignard reagent is prepared from 4.8 g. Mg, 15.2 cm.$^3$ of ethyl bromide and 120 cm.$^3$ of anhydrous tetrahydrofuran. 4 g. of ethynyl derivative IIb dissolved in 100 cm.$^3$ of anhydrous tetrahydrofuran, are added. After refluxing for 2.5 hours, the product is cooled with ice and salt at 0° C.; the suspension is then diluted with 200 cm.$^3$ of anhydrous ether and while stirring a rapid current of $CO_2$ dried in $H_2SO_4$ and $CaCl_2$, is passed through the suspension for 2 hours. The resulting mixture is stirred overnight at room temperature, then decomposed between 0–10° C. with 200 cm.$^3$ of $NH_4Cl$ saturated aqueous solution acidified with 10% HCl to Congo red. The organic solvent is separated and the waters extracted 3 times with 100 cm.$^3$ of ether per wash. The combined extracts are washed 3 times with 100 cm.$^3$ of 10% NaOH per wash and the alkaline aqueous solution washed 3 times with 200 cm.$^3$ of ether per wash and then acidified with 20% HCl under stirring to Congo red. After filtering and washing with water 1.9 g. of acid (IIIb) melting at 200–203° C. are obtained. A specimen crystallized from diluted methanol melts at 212–215° C. (with dec.).

EXAMPLE 5

*Lactone of 4-Hydroxy-4-(3β-Hydroxy-5-Androsten-17β-Yl)-2-Pentenoic Acid (IVa) From IIIa*

1.6 g. of acid IIIa are hydrogenated, at room temperature and pressure, in 800 cm.$^3$ of methanol with 5 g. of Lindlar palladium. At the end of absorption of the theoric hydrogen (1 mole), the catalyst is filtered, methanol is evaporated and the product crystallized from methanol, so that 700 mg. of lactone IVa melting at 205–211° C. are obtained. A further crystallized specimen melts at 206–209° C.

EXAMPLE 6

*Lactone of 4-Hydroxy-4-(3β-Acetoxy-5-Androsten-17β-Yl)-2-Pentenoic Acid (VIIa) From IVa*

400 mg. of lactone IVa are acetylated with 10 cm.$^3$ of acetic acid and 6.4 cm.$^3$ of acetic anhydride for 2 hours on a water bath; 4 cm.$^3$ of water are added, the mixture left on water bath for 30 minutes, cooled, diluted with 60 cm.$^3$ of water, and filtered. The residue is washed with water. The product is crystallized from methanol and 150 mg. of 3-acetyl derivative VIIa are obtained melting at 196–201° C.

EXAMPLE 7

*Lactone of 4-Hydroxy-4-(3β-Hydroxy-5-Androsten-17β-Yl)-2-Butenoic Acid (IVb) From IIIb*

1.05 g. of acid IIIb are hydrogenated, at room temperature and pressure, with 300 cm.$^3$ of methanol and 3 g. of Lindlar palladium. Within 15 minutes, 70 cm.$^3$ of $H_2$ (1 mole) are absorbed. The catalyst is filtered, the compound concentrated on a water bath and crystallized from dilute methanol; 400 mg. of lactone IVb melting at 195–207° C. are obtained. A specimen crystallized from methanol melts at 219–222° C.

400 mg. of crude lactone IVb melting at 195–207° C. are acetylated with 12 cm.$^3$ of acetic acid and 8 cm.$^3$ of acetic anhydride for 2 hours on a water bath. Afterwards 4 cm.$^3$ of water are added and the whole is left on water bath for 30 minutes, then diluted with 100 cm.$^3$ of water, cooled and filtered. The product is washed with water. By crystallization from methanol, the 3-acetate VIIb melting at 207–214° C. is obtained.

EXAMPLE 8

*Lactone of 4-Hydroxy-4-(3β-Hemisuccinoxy-5-Androsten-17β-Yl)-2-Butenoic Acid (VIIb₁) From IVb*

1 g. of crude lactone IVb is dissolved in 20 cm.$^3$ of pyridine and treated with 2 g. of succinic anhydride, then heated on a water bath till dissolution. The mixture is left for 7 days at room temperature, afterwards poured out into 300 cm.³ of water, acidified with 10% HCl to Congo red, and extracted with 300 cm.³ of ethyl acetate. The extract is washed 4 times with 100 cm.³ of water each time. Finally by drying and evaporating under vacuum, 1.25 g. of white solid melting at 195–209° C. are obtained. Crystallization from methanol gives 230 mg. hemisuccinate VII$b_1$ melting at 235–240° C.

EXAMPLE 9

Lactone of 4-Hydroxy-4-(3β-Hydroxy-5-Androsten-17β-Yl)-Pentanoic Acid (Va) From IIIa 1.6 g. of acid IIIa, dissolved in 200 cm.³ of tetrahydrofuran, are hydrogenated at room temperature and pressure with 400 mg. of 10% palladium over carbon. After absorption of the theoric $H_2$ (2 moles), the catalyst is filtered, the solvent evaporated and the residue crystallized from diluted methanol, to obtain 520 mg. of lactone Va melting at 230–240° C.

EXAMPLE 10

Lactone of 4-Hydroxy-4-(3β-Acetoxy-5-Androsten-17β-Yl)-Pentanoic Acid (IXa) From Va 500 mg. of lactone Va are acetylated with 6 cm.³ of acetic acid and 4 cm.³ of acetic anhydride for 2 hours on a water bath; 2 cm.³ of water are added, the whole is left on the water bath for 30 minutes, then cooled to room temperature, diluted with water and filtered by washing with water to neutrality. By crystallization from methanol, 200 mg. of 3-acetate IXa melting at 200–205° C. are obtained.

EXAMPLE 11

Lactone of 4-Hydroxy-4-(3β-Hydroxy-5-Androsten-17β-Yl)-Butanoic Acid (Vb) From IIIb 1.4 g. of acid IIIb, melting at 200–203° C., are dissolved in 360 cm.³ of methanol and hydrogenated at room temperature and pressure with 300 mg. of 10% palladium over carbon. After absorption of the theoric $H_2$ (2 moles) the catalyst is filtered and methanol evaporated under vacuum at 40° C. Yield: 1.4 g. of white solid, which is crystallized from methanol. 800 mg. of lactone Vb, melting at 242–248° C. are isolated. A specimen crystallized from methanol melts at 248–251° C.

EXAMPLE 12

Lactone of 4-Hydroxy-4-(3β-Acetoxy-5-Androsten-17β-Yl)-Butanoic Acid (IXb) From Vb 250 mg. of lactone Vb melting at 242–248° C. are acetylated with 16 cm.³ of acetic acid and 4 cm.³ of acetic anhydride for 2 hours on a water bath. The product is then diluted with 50 cm.³ of water; filtered, washed with warm water and crystallized from methanol, so that the 3-acetate IXb melting at 225–229° C. is obtained.

EXAMPLE 13

Lactone of 4-Hydroxy-4-(3β-Hydroxy-5α-Androstan-17β-Yl)-Pentanoic Acid (VIa) From IIIa 2.6 g. of acid IIIa are hydrogenated at room temperature and pressure in 600 cm.³ of methanol with 1 g. of 10% palladium over carbon. At the end of the hydrogenation (3 moles of hydrogen are absorbed) the catalyst is filtered, methanol evaporated under vacuum and the residue is crystallized from methanol to obtain 0.8 g. of lactone (VIa) melting at 237–240° C.

EXAMPLE 14

Lactone of 4-Hydroxy-4-(3β-Acetoxy-5α-Androstan-17β-Yl)-Pentanoic Acid (XIa) From VIa 300 mg. of lactone VIa are acetylated with 3 cm.³ of acetic acid and 2 cm.³ of acetic anhydride for 1 hour on a water bath. 1 cm.³ of water is then added and the whole is left on the water bath for 30 minutes, cooled to room temperature, diluted with water, filtered and washed with water to neutrality. 300 mg. of 3-acetate XIa (melting at 205–212° C.) are obtained, and by crystallization from methanol 90 mg. of pure product melting at 233–236° C.

EXAMPLE 15

Lactone of 4-Hydroxy-4-(3β-Hydroxy-5α-Androstan-17-β-Yl)-Butanoic Acid (VIb) From IIIb 1 g. of acid IIIb, melting at 200–203° C., dissolved in 100 cm.³ of methanol, is hydrogenated at room temperature and pressure with 300 mg. of palladium over carbon (3 moles of hydrogen are absorbed). The catalyst is filtered, methanol evaporated and 0.9 g. of lactone VIb, melting at 235–240° C., are isolated. The pure product, crystallized from methanol, melts at 246–249° C.

EXAMPLE 16

Lactone of 4-Hydroxy-4-(3β-Acetoxy-5α-Androstan-17β-Yl)-Butanoic Acid (XIb) From VIb 300 mg. of lactone VIb are acetylated with 2 cm.³ of acetic anhydride and 3 cm.³ of acetic acid for 1 hour on a water bath; then cooled, diluted with water and filtered. After crystallization the 3-acetate XIb, melting at 196–199° C. is obtained.

EXAMPLE 17

Lactone of 4-Hydroxy-4-(3-Keto-4-Androsten-17β-Yl)-2-Pentenoic Acid (VIIIa) From IVa 700 mg. of lactone IVa are oxidized with 150 cm.³ of anhydrous toluene, 15 cm.³ of cyclohexanone and 3 g. of aluminum isopropoxide by refluxing for 3 hours in anhydrous medium while stirring. Then toluene is steam-distilled. The residue is acidified with 10% $H_2SO_4$ to Congo red. The product is filtered and crystallized from methanol to obtain 150 mg. of lactone VIIIa melting at 230–233° C.; $\lambda_{max}=241$ m$\mu$ ($\epsilon=16,000$).

EXAMPLE 18

Lactone of 4-Hydroxy-4-(3-Keto-4-Androsten-17β-Yl)-Pentanoic Acid (Xa) From Va 250 mg. of lactone Va are oxidized, according to Oppenauer, with 50 cm.³ of toluene, 5 cm.³ of cyclohexanone and 1 g. of aluminum isopropoxide by refluxing for 3 hours in anhydrous medium while stirring. After steam distilling the toluene, the remainder is acidified with 10% $H_2SO_4$; extracted 4 times with 100 cm.³ of methylene chloride per wash; methylene chloride is washed with water and the solvent evaporated under vacuum. After crystallization from methanol, 40 mg. of Xa melting at 203–206° C. are obtained. $\lambda_{max}=241$ M$\mu$ ($\epsilon=17,200$).

EXAMPLE 19

Lactone of 4-Hydroxy-4-(3-Keto-5α-Androstan-17β-Yl)-Pentanoic Acid (XIIa) From Va 350 mg. of lactone Va are dissolved in 35 cm.³ of acetone, distilled on permanganate, and cooled to −10° C.; 3.5 g. of Kiliani solution (22.6 g. of $CrO_3$, 40 cm.³ of $H_2O$ and 23 cm.³ of conc. $H_2SO_4$ are diluted to 100 cm.³ with $H_2O$) are added to the mixture while stirring and bubbling nitrogen to said mixture. The mixture is stirred for 15 minutes at −15° C., then for 30 minutes without the cooling bath. The mixture is diluted with 150 cm.³ of water, extracted 3 times with 30 cm.³ of methylene chloride each time, and evaporated under vacuum. A solid white residue remains, which by crystallization from methanol gives 160 mg. of lactone XIIa melting at 212–215° C.

We claim:
1. Lactone of 4-hydroxy-4-(3β-hydroxy-5-androsten-17β-yl)-2-pentenoic acid.
2. Lactone of 4-hydroxy-4-(3β-hydroxy-5-androsten-17β-yl)-2-butenoic acid.
3. Lactone of 4-hydroxy-4-(3β-acetoxy-5-androsten-17β-yl)-2-pentenoic acid.
4. Lactone of 4-hydroxy-4-(3β-acetoxy-5-androsten-17β-yl)-2-butenoic acid.
5. Lactone of 4-hydroxy-4-(3β-hemisuccinoxy-5-androsten-17β-yl)-2-butenoic acid.
6. Lactone of 4-hydroxy-4-(3β-hemisuccinoxy-5-androsten-17β-yl)-butenoic acid.
7. Lactone of 4-hydroxy-4-(3-keto-4-androsten-17β-yl)-2-pentenoic acid.
8. Steroid compounds having the formula:

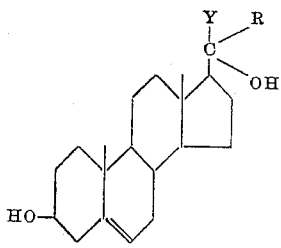

wherein Y is selected from the group consisting of H and $CH_3$ and R is selected from the group consisting of —C≡CH and —C≡C—COOH.

9. A process of preparing steroid compounds, characterized in that they are 4-(3-keto-17β-androstanyl) derivatives of the γ-valerolactones (and the homologous γ-butyrolactones) having the formula:

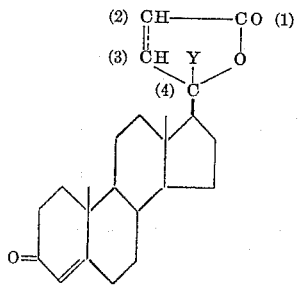

wherein a bond selected from the group consisting of single and double bond is present in the 2-3 position of the lactonic ring, and Y is selected from the group consisting of H and $CH_3$, said process characterized in that the starting products I, respectively pregnenolone (Ia) and the lower homologue 17-formyl-5-androsten-3β-ol-3-acetate (Ib) are transformed by a Grignard reaction with ethynylmagnesium-bromide in tetrahydrofuran, into the corresponding 20-ethynyl-5-pregnene-3β,20-diol (IIa) and 20-ethynyl-21-nor-5-pregnene-3β,20-diol (IIb); said ethynyl-derivatives (IIa) and (IIb) are carboxylated with carbon dioxide in a medium selected from the group consisting of ether and tetrahydrofuran to respectively give the corresponding acids, 4-hydroxy-4-(3β-hydroxy-5-androstene-17β-yl)-2-pentinoic acid (IIIa) and 4-hydroxy-4-(3β-hydroxy - 5 - androstene-17β-yl)-2-butinoic acid (IIIb); said acids (IIIa) and (IIIb) are selectively hydrogenated in a medium selected from the group consisting of alcoholic solution and tetrahydrofuran in the presence of palladium catalysts to produce a lactone selected from the group consisting of the lactone of 4-hydroxy-4-(3β-hydroxy-5-androsten-17β-yl)-2-pentenoic acid and the homologous 2-butenoic (IV), the lactone of 4-hydroxy-4-(3β-hydroxy-5-androsten-17β-yl)-pentanoic acid and the homologous butanoic (V), said lactones (IV) and (V) are oxidized to the corresponding 3-keto steroids by an oxidizing agent selected from the group consisting of aluminum isopropoxide in cyclohexanone and toluene and of chromic and sulfuric acids in acetone.

10. A process for preparing 4-(3β-hydroxy-17β-androstanyl) derivatives of the γ-valerolactones (and the homologous γ-butyrolactones) having the formula:

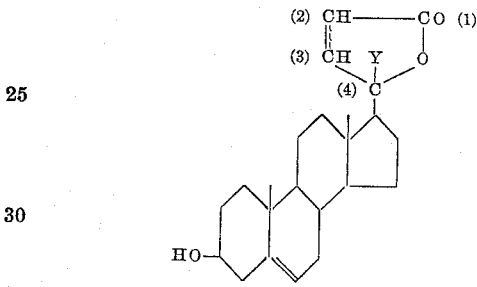

wherein a bond selected from the group consisting of single and double bonds is present in the 2-3 position of the lactonic ring; and Y is selected from the group consisting of H and $CH_3$; characterized in that the starting products III, respectively the 4-hydroxy-4-(3β-hydroxy-5-androsten-17β-yl)-2-pentinoic acid (IIIa) and the lower homologue 4 - hydroxy-4-(3β-hydroxy-5-androsten-17β-yl)-2-butinoic acid (IIIb) are hydrogenated at room temperature and pressure in a medium selected from the group consisting of alcoholic solution and tetrahydrofuran, obtaining respectively the lactone of the 4-hydroxy-4-(3β-hydroxy-5-androsten - 17β - yl) - 2 pentenoic acid (IVa) and the homologue 2-butenoic (IVb) when the process is carried out in the presence of Lindlar palladium and hydrogenation is interrupted when one mole of hydrogen has been absorbed; and the lactone of the 4-hydroxy-4-(3β-hydroxy-5-androsten-17β-yl)-pentanoic acid (Va) and the homologue butanoic (Vb) when the process is carried out in the presence of 10% palladium over carbon and the hydrogenation is interrupted when 2 moles of hydrogen have been absorbed.

References Cited in the file of this patent

Jones et al.: "Journal of American Chemical Society," vol. 81, October 5, 1959, page 5244.